(12) United States Patent
Fisher et al.

(10) Patent No.: US 12,486,616 B2
(45) Date of Patent: Dec. 2, 2025

(54) METHODS FOR CONTROLLING COLOR DURING A METALLIZATION PROCESS AND RESULTING PRODUCTS

(71) Applicant: NOBLE BIOMATERIALS, INC., Scranton, PA (US)

(72) Inventors: Bennett Fisher, Morganton, NC (US); Carl Jones, Peckville, PA (US); Jodi Wallis, Carbondale, PA (US); Dino Aimino, Newark, NY (US); Thomas Dougal, Old Forge, PA (US); Greg Gianforcaro, Clemson, SC (US); David Curry, Valdese, NC (US)

(73) Assignee: Noble Biomaterials, Inc., Scranton, PA (US)

( * ) Notice: Subject to any disclaimer, the term of this patent is extended or adjusted under 35 U.S.C. 154(b) by 113 days.

(21) Appl. No.: 17/400,999

(22) Filed: Aug. 12, 2021

(65) Prior Publication Data

US 2021/0372044 A1    Dec. 2, 2021

Related U.S. Application Data

(63) Continuation-in-part of application No. 17/161,364, filed on Jan. 28, 2021, now Pat. No. 11,905,648.

(Continued)

(51) Int. Cl.
*D06P 5/10* (2006.01)
*D06B 3/10* (2006.01)
(Continued)

(52) U.S. Cl.
CPC ............... *D06P 5/10* (2013.01); *D06B 3/10* (2013.01); *D06B 21/00* (2013.01); *D06M 11/83* (2013.01)

(58) Field of Classification Search
None
See application file for complete search history.

(56) References Cited

U.S. PATENT DOCUMENTS 4,681,591 A    7/1987 Okayasu et al.
4,925,706 A    5/1990 Kistrup et al.
(Continued)

FOREIGN PATENT DOCUMENTS

CN    107268214 A    10/2017
JP    2004257643 A    9/2004
(Continued)

OTHER PUBLICATIONS

Yu et al.; Simultaneous Dyeing and Deposition of Silver Nanoparticles on Cotton Fabric through in situ Green Synthesis with Black Rice Extract; Cellulose; 2020 vol. 27 pp. 1829-1843; published Oct. 15, 2019.*

(Continued)

*Primary Examiner* — Michael P. Rodriguez
(74) *Attorney, Agent, or Firm* — LEWIS RICE LLC

(57) ABSTRACT

System and methods that enables fabric to be metalized and dyed to reach final colors that were previously unobtainable. The systems and methods relate to processes for controlling the color of metalized fabrics. Specifically, for some embodiments, the systems and methods relate to methods of making metalized fabrics that are lighter in color than prior metalized fabrics. Such fabrics may be printed on or dyed using lighter colors than would be possible when using prior metalized fabrics. The systems and methods herein may include dye baths and wash baths that are hotter than prior art processes.

19 Claims, 1 Drawing Sheet

Related U.S. Application Data

(60) Provisional application No. 63/069,543, filed on Aug. 24, 2020, provisional application No. 62/966,855, filed on Jan. 28, 2020.

(51) Int. Cl.
 *D06B 21/00* (2006.01)
 *D06M 11/83* (2006.01)

(56) References Cited

U.S. PATENT DOCUMENTS

| | | | |
|---|---|---|---|
| 6,346,491 | B1 | 2/2002 | DeAngelis et al. |
| 10,203,183 | B2 | 2/2019 | Morag et al. |
| 10,519,583 | B2 | 12/2019 | Moon |
| 10,960,654 | B2 | 3/2021 | Morag et al. |
| 2006/0067965 | A1 | 3/2006 | Chandra et al. |
| 2018/0030599 | A1* | 2/2018 | Stremsdoerfer ......... C25D 5/56 |
| 2018/0066921 | A1 | 3/2018 | Wagner et al. |
| 2019/0017785 | A1* | 1/2019 | Morag ..................... B32B 5/06 |

FOREIGN PATENT DOCUMENTS

| | | | |
|---|---|---|---|
| JP | 2007063744 A | | 3/2007 |
| JP | 2007146339 A | * | 6/2007 |
| JP | 2008223189 A | | 9/2008 |
| JP | 2014061646 A | | 4/2014 |
| KR | 20050094272 A | * | 9/2005 |
| KR | 1020050094272 A | | 9/2005 |
| KR | 20120029217 A | * | 3/2012 |
| KR | 1020120029217 A | | 3/2012 |
| WO | 2007069803 A1 | | 6/2007 |

OTHER PUBLICATIONS

International Search Report and Written Opinion in PCT/US2021/047319, mailed Dec. 15, 2021, 13 pages.
Extended European Search Report in EP21747008.7, mailed Apr. 15, 2024, 9 pages.
Extended European Search Report in EP21862558.0, mailed Oct. 16, 2024, 7 pages.
Montazer et al., "Simultaneous Dyeing and Antibacterial Finishing of Nylon Fabric Using Acid Dyes and Colloidal Nanosilver." Fibres & Textiles in Eastern Europe, 2015, vol. 23, No. 2, pp. 100-106.
Yu et al., "Simultaneous dyeing and deposition of silver nanoparticles on cotton fabric through in situ green synthesis with black rice extract," Cellulose, 2020, vol. 27, pp. 1829-1843.

* cited by examiner

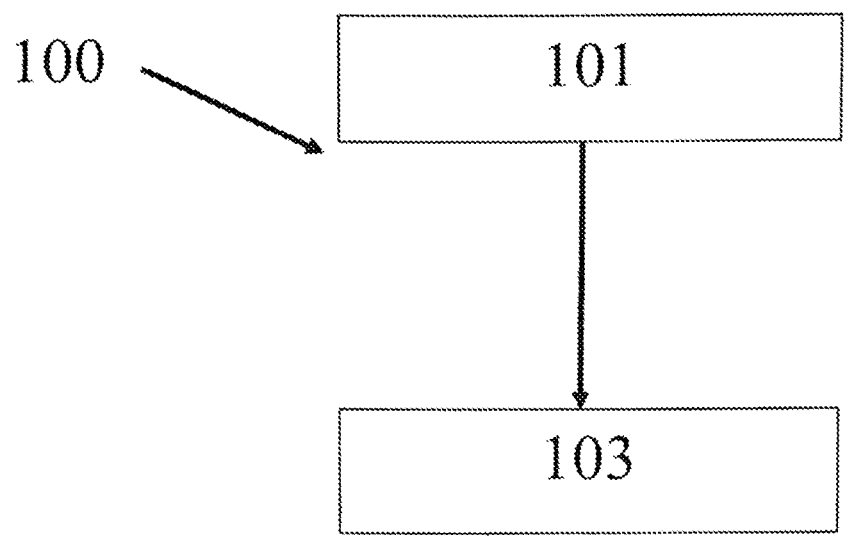

METHODS FOR CONTROLLING COLOR DURING A METALLIZATION PROCESS AND RESULTING PRODUCTS

CROSS REFERENCE TO RELATED APPLICATION(S)

This Application claims the benefit of U.S. Provisional Patent Application No. 63/069,543, filed Aug. 24, 2020 and currently pending. This Application also is a Continuation-In-Part (CIP) of U.S. patent application Ser. No. 17/161,364, filed Jan. 28, 2021 and currently pending, which claims the benefit of U.S. Provisional Patent Application 62/966,855 filed Jan. 28, 2020 and now expired. The entire disclosures of all the above documents is incorporated herein by reference.

BACKGROUND

1. Field of the Invention

This disclosure is related to the field of metalized fabrics. More particularly, this disclosure is related to controlling color during a metallization process for a metalized fabric. Also described are fabrics made using the same.

2. Description of the Related Art

Metalized fabrics and materials have been used for many years for various purposes. For example, metalized films, such as Mylar, have been used in many different ways, including as emergency blankets and insulation in spacesuits. Metalized fibers have been used to create metalized fabrics. Such fibers have been used to make non-woven fabrics, including metalized felts. These felts may be used to form conductive mats, for example, for use as shielding from electromagnetic interference. Metalized fibers have been used to create metalized yarns. Such yarns may be used to make metalized fabrics.

Metalized fibers may take many forms, some being pure metal, similar to a metal wire, and other incorporating other elements, such as plastics, cotton, or other materials. Metalized fibers may be incorporated into fabrics to provide a number of different utilities, including, without limitation, antimicrobial properties, odor-reduction properties, electrical conductance properties, antistatic properties, and other useful properties. For example, metalized fibers, as well as uses of such fibers, are described in U.S. Patent Application Publication No. 2006/0067965, the entirety of which is incorporated herein by reference. Specifically, U.S. Patent Application Publication No. 2006/0067965 describes, amongst many things, garments that may be made using a metalized fabric that has antimicrobial, odor-reducing, and insect-repelling properties. The fabrics may be formed by coating at least some fibers with metallic materials, such as silver, or by impregnating the fibers with metallic materials. The result may be a metalized (at least partially) fabric having the above benefits.

Another example of a prior metalized fabric is an infrared camouflage that is described in U.S. patent application Ser. No. 16/025,642, the entire disclosure of which is incorporated herein by reference. In this patent application, in one embodiment, a multilayer fabric is used to provide some infrared camouflage. The multilayer fabric includes a base fabric, a thin metallic coating, and a printed layer. The thin metallic coating reflects some infrared light, while the printed layer provides some visible camouflage. However, this multilayer fabric has some limitations. For example, the multilayer fabric is relatively stiff. Moreover, the material will create an unwanted infrared shadow, which may be detectable by infrared observation. This may be because metallic cloths are typically opaque to infrared light, which opaqueness may create an infrared shadow, which shadow may be observed. An infrared shadow, as used herein, is the result of the metallic cloth reflecting all of the infrared light from the surroundings of the metallic cloth, which reflections may make the wearer of the metallic cloth appear to be a part of the general surrounding environment between the observer and the wearer. However, if an area behind the wearer is either hotter or colder than the surrounding environment between the observer and the wearer, it may be clear to an observer using infrared sensing equipment that an object is passing in front of that hotter or colder region. In other words, the metallic cloth may create a significant contrast between the metallic cloth and the background at the location of the metallic cloth.

This is due, in part, to the fact that the metallic cloth does not reflect what is behind the wearer, but instead, reflects what is in front of the wearer. Therefore, any differences in temperature between the background and the foreground of the wearer may expose the wearer to infrared sensing equipment or observation in the same way that carrying a mirror may result in detection in the visible light spectrum even though the individual carrying the mirror is technically hidden. In effect, an infrared shadow results in detection because the void of infrared detection created by such a metallic cloth is itself unnatural and detectable.

A further, important limitation for such metallic cloths is that the metalized cloth itself cannot be readily dyed or easily printed on, so the metallic cloths are generally very visibly conspicuous. In some instances, metallic cloths may be screen printed on, but the screen printing process often makes the metallic cloths overly stiff. Further, the available colors for printing typically must be very dark, due to the relatively dark coloring of the metallic cloth itself. In order to provide a fabric that is deceptive in both the visible spectrum and the infrared spectrum, some solutions, such as those described in U.S. patent application Ser. No. 16/025,642, provide an inner layer that is infrared deceptive and an outer layer that is visibly deceptive. These solutions, however, are not ideal for the reasons discussed above and because this structure may be inefficient by requiring multiple layers.

In another embodiment described in U.S. patent application Ser. No. 16/025,642, a metallic-coated thread may be woven together with a similar but uncoated thread to create a fabric that may dissipate and scatter infrared light. This woven fabric may be more ductile than the other prior infrared camouflages discussed above. Further, this woven fabric may help scatter background infrared light around the material itself, helping to blur any infrared shadow created by the masking of the infrared light emitted by the wearer and the background.

However, this woven fabric has its own limitations. For example, the woven fabric requires the use of metalized thread, and metalized thread may be very expensive and relatively inefficient to produce, at least because the metallization must occur at the thread stage of clothing production and not at the fabric or garment stages. Accordingly, the process of making the final woven material and subsequent garment may be relatively inefficient and expensive. Further, there are limits to the fabric maker's ability to dye or print on such metalized fabrics, at least because such techniques poorly adhere to metallic threads. Further, printing on or dying metallic threads typically require the use of darker pigmentation because otherwise the metallic thread will shine though the printing material. Typical metallic fibers have a greyish hue, which may be unacceptable for printing light colors over the metallic fibers. Accordingly, it may not be possible to print lighter colors on a metalized woven fabric, even if the fabric maker or end-user desires a lighter printing scheme.

In summary, the prior attempts at making metalized fabrics discussed above have limitations. For example, the multilayered materials are typically formed using glues, resins, or other materials that are stiff and unbreathable. Accordingly, the resulting fabrics and garments themselves are typically stiff and unbreathable. Further, the presence of glue, resins, and other materials may reduce the fabric's ability to mask or scatter infrared light. The stiffness may also create issues when attempting to form garments from the fabric. As a result, such garments are typically limited to ponchos and other garment designs that are not form fitting and do not move with the movements of the garment wearer. Further, these materials typically result in garments that are relatively uncomfortable to wear. For woven materials, such materials have some improved properties, but have other drawbacks. These drawbacks include additional expenses and difficulties in printing and dying the woven material.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a method for dying and metalizing fabric, the method comprising: providing a base fabric; providing a dye bath maintained at a first predetermined temperature; providing a washing bath maintained at a second predetermined temperature; dying the base fabric in the dye bath; metalizing at least a portion of the base fabric; washing the base fabric in the washing bath; and drying the base fabric.

In an embodiment of the method, the first predetermined temperature is about 23° C. or greater.

In an embodiment of the method, the second predetermined temperature is about 70° C. or greater.

In an embodiment of the method, the first predetermined temperature is about 25° C. or greater.

In an embodiment of the method, the first predetermined temperature is in a range of about 30° C. to about 40° C.

In an embodiment of the method, the metallization is performed within the dye bath.

In an embodiment of the method, a majority of the base fabric is metalized.

In an embodiment of the method, the base fabric is processed into a garment after the drying.

In an embodiment of the method, the metallization begins before the dying is completed.

In an embodiment of the method, the dying begins before the metallization is completed.

In an embodiment of the method, the metallization and the dying begin substantially simultaneously.

In an embodiment of the method, the metalizing at least a portion of the base fabric further includes the use of autocatalysis to coat at least a portion of the fabric with a metal.

In an embodiment of the method, the metallization uses silver.

In an embodiment of the method, the method further includes introducing dye and a reducing agent into the dye bath after the base fabric has been introduced into the dye bath; and maintaining the predetermined first temperature of the dye bath after introducing dye and a reducing agent into the dye bath.

In an embodiment of the method, the maintaining the predetermined first temperature of the dye bath after introducing the dye and the reducing agent into the dye bath comprises tilling the dye bath using a tiller.

In an embodiment of the method, the introduction of the dye and reducing agent into the dye bath is substantially performed at one time.

In an embodiment of the method, the introduction of the dye and reducing agent into the dye bath is substantially performed in small increments over time.

BRIEF DESCRIPTION OF THE DRAWINGS

FIG. 1 depicts a block diagram of a process for controlling color during a metallization process for a metalized fabric in accordance with this application.

DETAILED DESCRIPTION OF THE EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives, and uses of the disclosed systems and methods. As various changes could be made in the above constructions without departing from the scope of the disclosures, it is intended that all matters contained in the description or shown in the accompanying drawings shall be interpreted as illustrative and not in a limiting sense.

This disclosure relates to processes for controlling the color of metalized fabrics. Specifically, for some embodiments, this disclosure relates to methods of making metalized fabrics that are lighter in color than prior metalized fabrics. Such fabrics may be printed on or dyed using lighter colors than would be possible when using prior metalized fabrics.

Throughout this disclosure, the inventions of this application will primarily be described as pertaining to a weave or a woven material. This focus on woven fabrics allows for the clear illustration of some of the embodiments of the inventions disclosed herein. For example, the use of weave patterns may be useful in creating metalized fabrics that are not completely or uniformly metalized. However, this description is not intended to be limited only to weaves and woven material. Materials and fabrics within the scope of this disclosure include, without limitation, any materials woven, knitted, bound, bonded, crocheted, knotted, tatted, felted, braided, or otherwise formed. Such materials include fabrics or other materials formed by application of heat or pressure to filaments or other materials. For example, without limitation, this application includes within its scope non-woven materials made to form fabrics that are not woven or knitted, such as felts or fleeces. Accordingly, as would be appreciated by a person of ordinary skill in the art, the teachings herein are applicable to fabrics made by any method known to persons of ordinary skill in the art.

Further, a person of ordinary skill in the art will recognize some of the potential benefits of embodiments of fabrics made in accordance with this disclosure. Generally, fabrics may be metalized to take advantage of properties endowed by the metallization. As discussed above, these properties may include, without limitation, antimicrobial properties, odor-reduction properties, electrical conductance properties, antistatic properties, and other useful properties. Further, the color of the base metalized fabric may be lighter than prior metalized fabrics. In explaining further, a standard setting organization referred to as the Commission Internationale de l'Eclairage (which is also known as CIE), has developed a means of defining colors into a color space known as the CIELAB color space, or CIE L*a*b* color space. In this color space, the L* represents levels of lightness ranging from white to black, the a* represents color from green to red, and the b* represents color from blue to yellow. Thus, by using the methods described herein, a metalized fabric may be made having improved, or lessened, L* values, which indicates increased lightness.

FIG. 1 depicts a block diagram of an embodiment of a method of making a metalized fabric that may have a controlled color. Specifically, FIG. 1 depicts an embodiment of a fabric dying process (100) that includes two principle steps: introducing the fabric to a bath (101) and subsequently washing the fabric (103). In other embodiments, the fabric dying process (100) may include more or less steps.

Prior to the first step of the dying process (100), the introduction of the fabric to a bath (101), the fabric must be manufactured. The fabric may be any fabric capable of being dyed. In some embodiments, the fabric may include at least some component that is metalized. In other embodiments, the entire fabric may be metalized. In yet other embodiments, the fabric may only be partially metalized. However, typically, the fabric will not yet be metalized. In typical cases, the fabric will be metalized during the dying process (100).

The fabric will be composed of one or more materials. In some embodiments where the fabric is not yet metalized before the dying process (100), the fabric may be made from multiple materials that each have a different affinity for metallization. For example, in some embodiments, the fabric will be made from fibers of nylon and polyester. As another example, in some embodiments, the fabric will be made from fibers of nylon, polyester, and spandex. In some embodiments, the different materials will be included within the fabric in equal quantities by mass, weight, or length. In other embodiments, the different materials will be included within the fabric in unequal quantities.

As discussed above, the materials (which will typically be in the form of a fiber but may be otherwise) used to make the fabric include, without limitation, any materials woven, knitted, bound, bonded, crocheted, knotted, tatted, felted, braided, or otherwise formed. Such materials include fabrics or other materials formed by application of heat or pressure to filaments or other materials. In the embodiments where the fabric has not yet been metalized, more than one material will typically be used with each material having a different affinity for metallization.

Once the fabric has been procured, a dye bath may be prepared. In embodiments where the fabric has not yet been metalized before the dying process (100), the dye bath may also serve as a bath for metallization. Alternately, the fabric may be metalized in a separate bath either before or after the introduction of the fabric into a dye bath (101). Typically, any dye bath that is capable of dying the chosen fabric may be used. In some embodiments, the dye bath may include dyes and other materials intended to cause the fabric to take on a preferred color. The dyes may be basic, acidic, or otherwise. The dye will typically be selected based on the materials to be dyed and the intended application for the fabric, as would be understood by persons of ordinary skill in the art. In some cases, a reducing agent may be used to improve the dye's solubility in water, which improved solubility may improve the ability of the dye to be taken in by the fabric. The dye may subsequently be oxidized to bring the dye back to an insoluble state, wherein the dye may remain with or within the fabric. In some embodiments, the oxidation may occur by exposure to air when the fabric is removed from the relevant bath.

In some embodiments, the dye bath may include materials for metalizing some or all of the fabric. Any metallization process known to persons of ordinary skill in the art may be used. In some embodiments, the metallization process may metalize the entire fabric. Such metallization may range from partial to complete metallization. In some embodiments, some portions of the fabric may be metalized to a greater extent that other portions of the fabric. In some embodiments wherein different portions of the fabric are metalized to different extents, the metallization process may preferentially metalize one constituent material of the fabric over another constituent material. In some such embodiments, the metallization process may use autocatalysis to coat at least portions of the fabric with a metal.

In such an embodiment that uses autocatalysis to metalize the fabric, or even a portion of the fabric, the metallization bath may include metal salts and a reducing agent, along with complexing agents, stabilizers, or buffers that may enhance the autocatalytic process or maintain the necessary pH for the process. In some embodiments, the metal deposited on or in the fabric may be silver. In other embodiments, the metal may be any metal known to persons of ordinary skill in the art. In some embodiments, the dye bath and the metallization bath may be the same bath. In such an embodiment, the materials included in the bath will be able to both dye and metalize at least a portion of the fabric.

In other embodiments, the dye bath and the metallization bath may be separate from each other. In such embodiments, the fabric may be introduced into the dye bath before being introduced into the metallization bath, or vice versa. Intermediate steps may be taken between introducing the fabric to each bath. For example, the fabric may be washed between baths. In other embodiments, the fabric may be oxidized, heated, dried, or otherwise processed between baths.

In any case, the bath for dying may be maintained at a specified temperature. Generally, the bath temperature will be brought up to an initial starting temperature and subsequently lowered to a process temperature. The process temperature will typically be maintained during the entire time the fabric is introduced into the dye bath (101). Prior dye baths were typically heated to a peak bath temperature of about 70° F. (about 21° C.). Once the fabric would be added to the prior dye bath, the temperature would typically fall. In prior processes, the temperature would be maintained in some processes and not maintained in others. In the processes described herein, the initial starting temperature of the dye bath may be in a range of about 23° C. or greater. In some embodiments, the initial starting temperature of the dye bath may be in a range of about 25° C. or greater. In still other embodiments, the initial starting temperature of the dye bath may be in a range of about 30° C. to about 40° C.

In some embodiments, the dye bath will not be fully prepared when the fabric is introduced into the bath. In particular, the dye and reducing agent may be added to the dye bath after the fabric is introduced into the dye bath. In prior processes wherein the dye and reducing agent are added to the dye bath after the introduction of the fabric, the dye and reducing agent were typically added in small amounts over a period of time, such as over about 30 minutes. In the processes disclosed herein, this process of adding the dye and reducing agent may occur more quickly. In some embodiments, all of the dye and reducing agent material to be added to the dye bath may be added together at a single time or over a relatively brief amount of time, such as over a time period of less than about a minute, less than about thirty seconds, less than about 10 seconds, or less than about a single second.

The effect of adding the reducing agent and the dye to the dye bath will typically be to increase the temperature of the dye bath. This may be due to the exothermic nature of these materials entering a solution with the bath or the exothermic nature of these materials' interactions with each other and with other constituents of the dye bath. In any case, the processes disclosed herein will attempt to maintain a specified temperature, and accordingly, will typically make some efforts to prevent the dye bath from increasing in temperature as the dye and reducing agent are added to the bath. This maintenance of the dye bath temperature may be made by performing any action known to persons of ordinary skill in the art that may effectively reduce the temperature of the heating dye bath or otherwise generally maintain the specified temperature. For example, in some embodiments, the dye bath may include a tiller that may assist in maintaining the specified temperature. Without being bound by any particular manner of operation, the tiller may assist in maintaining the specified temperature by mixing the contents of the dye bath, by exposing the constituents of the dye bath to air, or by another means.

After being dyed and metalized, the fabric will be washed (103). The washing process (103) may be used to remove and excess material leftover from the fabric's exposure to the dye bath (101). Such materials to be removed may include excess dye, reduction agents, metal materials, or any other material present in the dye bath. The washing process (103) typically comprises immersing the dyed and metalized fabric in a hot bath of water. Prior washing baths typically were heated to a temperature of about 120° F. (about 49° C.). In the washing process (103) disclosed herein, the washing bath temperature may be maintained at equal to or greater than about 70° C.

After washing, the fabric may be further processed. For example, the fabric may be further dried, further dyed, printed upon, scoured, or otherwise processed. Further, the fabric may be packaged or otherwise situated for subsequent processing. For example, the fabric may be packaged for sale or may be processed into a garment or other structured composition including the fabric. Such garments or other structured compositions may be capable of showing visible colors that prior methods of metalizing and dying fabric were not capable of producing.

While the invention has been disclosed in conjunction with a description of certain embodiments, including those that are currently believed to be useful embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The qualifier "generally," and similar qualifiers as used in the present case, would be understood by one of ordinary skill in the art to accommodate recognizable attempts to conform a device to the qualified term, which may nevertheless fall short of doing so. This may be because related terms are purely geometric constructs having no real-world equivalent (for example, no sphere is every perfectly spherical), or there may be other reasons why a given term may be more precise than its real-world equivalent. Variations from geometric, mathematical, and other descriptions are unavoidable due to, among other things, manufacturing tolerances resulting in shape variations, defects and imperfections, non-uniform thermal expansion, and natural wear. Moreover, there exists for every object a level of magnification at which geometric, mathematical, and other precise descriptors fail, due to the nature of matter. One of ordinary skill would thus understand the term "generally" and relationships contemplated herein, regardless of the inclusion of such qualifiers to include a range of variations from the literal geometric, mathematic, or other meaning of the term in view of these and other considerations.

The invention claimed is:

1. A method for dying and metalizing fabric, the method comprising:
   providing a base fabric;
   providing a dye bath including a metal salt, a reducing agent, and a dye maintained at a first predetermined temperature;
   providing a washing bath maintained at a second predetermined temperature different from the first predetermined temperature;
   dying the base fabric and metalizing at least a portion of the base fabric in the dye bath while maintaining said first predetermined temperature;
   washing the base fabric in the washing bath; and
   drying the base fabric.

2. The method of claim 1, wherein the first predetermined temperature is about 23° C. or greater.

3. The method of claim 2, wherein the second predetermined temperature is about 70° C. or greater.

4. The method of claim 1, wherein the first predetermined temperature is about 25° C. or greater.

5. The method of claim 4, wherein the second predetermined temperature is about 70° C. or greater.

6. The method of claim 1, wherein the first predetermined temperature is in a range of about 30° C. to about 40° C.

7. The method of claim 6, wherein the second predetermined temperature is about 70° C. or greater.

8. The method of claim 1, wherein the second predetermined temperature is about 70° C. or greater.

9. The method of claim 1, wherein a majority of the base fabric is metalized.

10. The method of claim 1, wherein the base fabric is processed into a garment after the drying.

11. The method of claim 1, wherein the metallization begins before the dying is completed.

12. The method of claim 1, wherein the dying begins before the metallization is completed.

13. The method of claim 1, wherein the metallization and the dying begin substantially simultaneously.

14. The method of claim 1, wherein the metalizing at least a portion of the base fabric further includes the use of autocatalysis to coat at least a portion of the fabric with a metal.

15. The method of claim 1, wherein the metallization uses silver.

16. The method of claim 1, further comprising:
   introducing dye and a reducing agent into the dye bath after the base fabric has been introduced into the dye bath; and
   maintaining the predetermined first temperature of the dye bath during and after introducing dye and a reducing agent into the dye bath.

17. The method of claim 16, wherein the maintaining the predetermined first temperature of the dye bath after introducing the dye and the reducing agent into the dye bath comprises tilling the dye bath using a tiller.

18. The method of claim 16, wherein the introduction of the dye and reducing agent into the dye bath is substantially performed at one time.

19. The method of claim 16, wherein the introduction of the dye and reducing agent into the dye bath is substantially performed in small increments over time.

* * * * *